US012623895B2

(12) United States Patent
Imai

(10) Patent No.: US 12,623,895 B2
(45) Date of Patent: May 12, 2026

(54) CAP DETACHMENT DEVICE

(71) Applicant: Surpass Industry Co., Ltd., Saitama (JP)

(72) Inventor: Hiroshi Imai, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 497 days.

(21) Appl. No.: 18/224,178

(22) Filed: Jul. 20, 2023

(65) Prior Publication Data

US 2024/0025718 A1 Jan. 25, 2024

(30) Foreign Application Priority Data

Jul. 21, 2022 (JP) ................................ 2022-116555

(51) Int. Cl.
*B67B 7/18* (2006.01)

(52) U.S. Cl.
CPC ................................... *B67B 7/182* (2013.01)

(58) Field of Classification Search
CPC .... B67B 7/182; B25J 9/04; B25J 13/08; B25J 11/00
See application file for complete search history.

(56) References Cited

U.S. PATENT DOCUMENTS 6,725,890 B1 * 4/2004 Green ...................... B65B 3/28 141/168
2003/0196723 A1 * 10/2003 Ozawa ................ B67D 7/0288 141/326
2015/0175289 A1 * 6/2015 Zumbach ............. B65B 7/2835 53/492

FOREIGN PATENT DOCUMENTS

JP 2018-020793 A 2/2018

* cited by examiner

*Primary Examiner* — Jason K Niesz
(74) *Attorney, Agent, or Firm* — Panitch Schwarze Belisario & Nadel LLP

(57) ABSTRACT

Provided is a cap detachment device including a plug, a cap part, and a cap tool that detaches the cap part from the plug. The cap tool has a holding part that holds the cap part, a grip part gripped by a robot holding the cap tool, a support part attached to the grip part and supporting the holding part movably along the cap axis, a spring that applies, to the holding part, pushing force in a direction coming close to the plug along the cap axis, and a rotary shaft that rotates the holding part about the cap axis, and the rotary shaft rotates the holding part holding the cap part about the cap axis and thereby detaches the cap part from the plug.

5 Claims, 12 Drawing Sheets

CAP DETACHMENT DEVICE

CROSS-REFERENCE TO RELATED APPLICATIONS

This application is based on Japanese Patent Application No. 2022-116555 filed on Jul. 21, 2022, the contents of which are incorporated herein by reference in its entirety.

BACKGROUND

1. Technical Field

The present invention relates to a cap detachment device.

2. Description of Related Art

Conventionally, a liquid supply device that supplies a liquid contained in a liquid storage container to a plurality of supply target devices is known (for example, see Japanese Patent Application Laid-Open No. 2018-20793).

The liquid supply device disclosed in Japanese Patent Application Laid-Open No. 2018-20793 couples a liquid channel formed in a plug and a liquid channel formed in a socket to each other by fixing the plug to an opening of a liquid storage container and attaching the socket to the plug. When attaching the socket to the plug, a worker engages an external thread formed in an attaching nut of the socket with an internal thread part formed in the plug.

In the liquid storage container disclosed in Japanese Patent Application Laid-Open No. 2018-20793, to prevent a liquid stored therein from flowing out via the plug, a sealing part is attached to the inner circumferential face of the plug. The thread of the sealing part is fastened into the thread of the plug, and thereby the sealing part is secured in the plug. When a liquid stored in the liquid storage container is supplied to a supply target device, a socket is attached in place of the sealing part.

When a liquid stored in the liquid storage container is supplied to a supply target device, to attach the socket, a worker has to rotate the sealing part to release fastening between the thread of the sealing part and the thread of the plug. This may increase the workload on the worker and cause the worker to be exposed to danger when a highly hazardous liquid is handled.

Accordingly, to prevent the workload on the worker from increasing or prevent the worker from being exposed to danger, it is conceivable to use a robot hand configured to hold the sealing part and thereby automate the operation of detaching the sealing part from the plug. For example, it is conceivable to memorize in advance the position of the sealing part disclosed in Japanese Patent Application Laid-Open No. 2018-20793, move the robot hand to the memorized position to hold the sealing part, and then rotate the sealing part.

However, when the sealing part is rotated for releasing the fastening between the thread of the sealing part and the thread of the plug, the sealing part moves in a direction away from the plug in response to the rotation, and it is thus required to suitably move the robot hand in accordance with the amount of motion. If the amount of motion is unsuitable, it may not be possible to suitably detach the sealing part from the plug, or it may not be possible to maintain the state where the robot hand holds the sealing part.

BRIEF SUMMARY

The present invention has been made in view of such circumstances and intends to provide a cap detachment device that can automate an operation to suitably move a holding part holding a cap part in accordance with an amount of motion of the cap part and thereby detach the cap part from the plug.

To solve the problem described above, the present invention employees the following solutions.

A cap detachment device according to one aspect of the present invention includes: a plug secured in an opening provided in a top face of a liquid storage container, the plug having a liquid channel extending in a first axis and a groove extending annularly about the first axis; a cap part having an insertion part and configured to seal the liquid channel, the insertion part being inserted in the groove and extending cylindrically about the first axis; and a detachment mechanism configured to detach the cap part from the plug. A first thread part is formed to the insertion part, a second thread part configured to be engaged with the first thread part is formed in the groove, the detachment mechanism has a holding part configured to hold the cap part, a grip part formed tubularly along a second axis and gripped by a gripping mechanism configured to grip the detachment mechanism, a support part attached to the grip part and configured to support the holding part movably along the second axis, a pushing part formed of an elastic member that expands and contracts along the second axis and applying, to the holding part, pushing force in a direction coming close to the plug along the second axis, and a rotary part configured to rotate the holding part about the second axis, and the rotary part rotates the holding part holding the cap part in a predetermined direction about the second axis to detach the cap part from the plug.

According to the cap detachment device of one aspect of the present invention, the detachment mechanism having the grip part gripped by the gripping mechanism uses the holding part to hold the cap part attached to the plug. The rotary part of the detachment mechanism rotates the holding part in a predetermined direction about the second axis and thereby detaches the cap part from the plug. When the cap part is detached from the plug, the first thread part of the cap part and the second thread part of the plug are gradually disengaged, and the cap part is moved in a direction away from the plug.

The holding part holding the cap part is supported movably along the second axis by the support part, and pushing force is applied by the pushing part to the holding part in the direction coming close to the plug along the second axis. Thus, in detachment of the cap part from the plug, when the cap part is moved in the direction away from the plug, the elastic member of the pushing part is contracted with the position of the support part being fixed, and the holding part is moved in the direction away from the plug along the second axis.

Since the position on the second axis of the holding part is changed with respect to the support part with the position of the support part left fixed, the position of the gripping mechanism gripping the grip part is not required to be moved in accordance with the motion of the cap part. It is therefore possible to provide a cap detachment device that can automate the operation to suitably move the holding part holding the cap part in accordance with an amount of motion of the cap part and thereby detach the cap part from the plug.

The cap detachment device according to one aspect of the present invention may be of a configuration that has a transmission part formed of an elastically deformable material in a long shape, connected to a motive power mechanism, and configured to transmit rotary motive power generated by the motive power mechanism to the rotary part.

According to the cap detachment device of the present configuration, since the transmission part is elastically deformable, even when the detachment mechanism is arranged at any position on the three-dimensional space by the gripping mechanism, the rotary motive power generated by the motive power mechanism can be reliably transmitted to the rotary part. Further, since no motive power mechanism that generates rotary motive power is required to be provided to the detachment mechanism, this can reduce the size of the detachment mechanism that is gripped by the gripping mechanism.

The cap detachment device of the configuration described above is preferably of a form including a first detection unit configured to detect an expanded state where the elastic member is expanded; a second detection unit configured to detect a contracted state where the elastic member is contracted; and a control unit configured to perform control to start transmission of the rotary motive power from the motive power mechanism to the transmission part when the first detection unit detects the expanded state and stop transmission of the rotary motive power from the motive power mechanism to the transmission part when the second detection unit detects the contracted state.

According to the cap detachment device of the present aspect, the control unit controls the motive power mechanism to start transmission of rotary motive power to the transmission part when the first detection unit detects the expanded state of the elastic member. It is thus possible to start the operation to detach the cap part from the plug while the cap part is pushed by the pushing part to a position close to the plug. Further, the control unit controls the motive power mechanism to stop the transmission of rotary motive power to the transmission part when the second detection unit detects the contracted state of the elastic member. It is thus possible to stop the transmission of rotary motive power from the motive power mechanism to the rotary part while the elastic member of the pushing part is contracted and the cap part has been detached from the plug.

The cap detachment device according to one aspect of the present invention may be configured such that the cap part is formed of a resin material, that a housing groove, which is formed annularly about the first axis and configured to house the holding part, and a center part, which is arranged on an inner circumferential side of the housing groove and held by the holding part, are formed on a top face of the cap part, that a recess in which a lock mechanism configured to hold the center part by elastic force is arranged is formed in a bottom face of the holding part, and that the holding part holds the center part, which is housed in the recess, by the lock mechanism so that the center part is not rotated about the second axis.

According to the cap detachment device of the present configuration, the holding part housed in the housing groove formed in the top face of the cap part holds the center part of the cap part by the lock mechanism so that the center part is not rotated about the second axis. Thus, the rotary part rotates the holding part about the second axis, and this enables rotation of the cap part about the second axis. Further, since the center part of the cap part is housed in the recess formed in the bottom face of the holding part and fixed by the lock mechanism, there is no likelihood of elastic deformation of the cap part formed of a resin material and release of the state where the lock mechanism fixes the cap part. This is because the lock mechanism applies force inwardly to fix the center part toward the second axis and this causes almost no elastic deformation of the cap part.

The cap detachment device according to one aspect of the present invention may be configured such that, while holding the cap part, the rotary part rotates the holding part in a direction opposite to the predetermined direction to attach the cap part to the plug.

According to the cap detachment device of the present configuration, it is possible to attach the cap part to the plug by rotating the holding part in the direction opposite to the predetermined direction by the rotary part of the detachment mechanism used for detaching the cap part form the plug.

According to the present invention, it is possible to provide a cap detachment device that can automate an operation to suitably move a holding part holding a cap part in accordance with an amount of motion of the cap part and thereby suitably detach the cap part from the plug.

DETAILED DESCRIPTION

Figure 1:
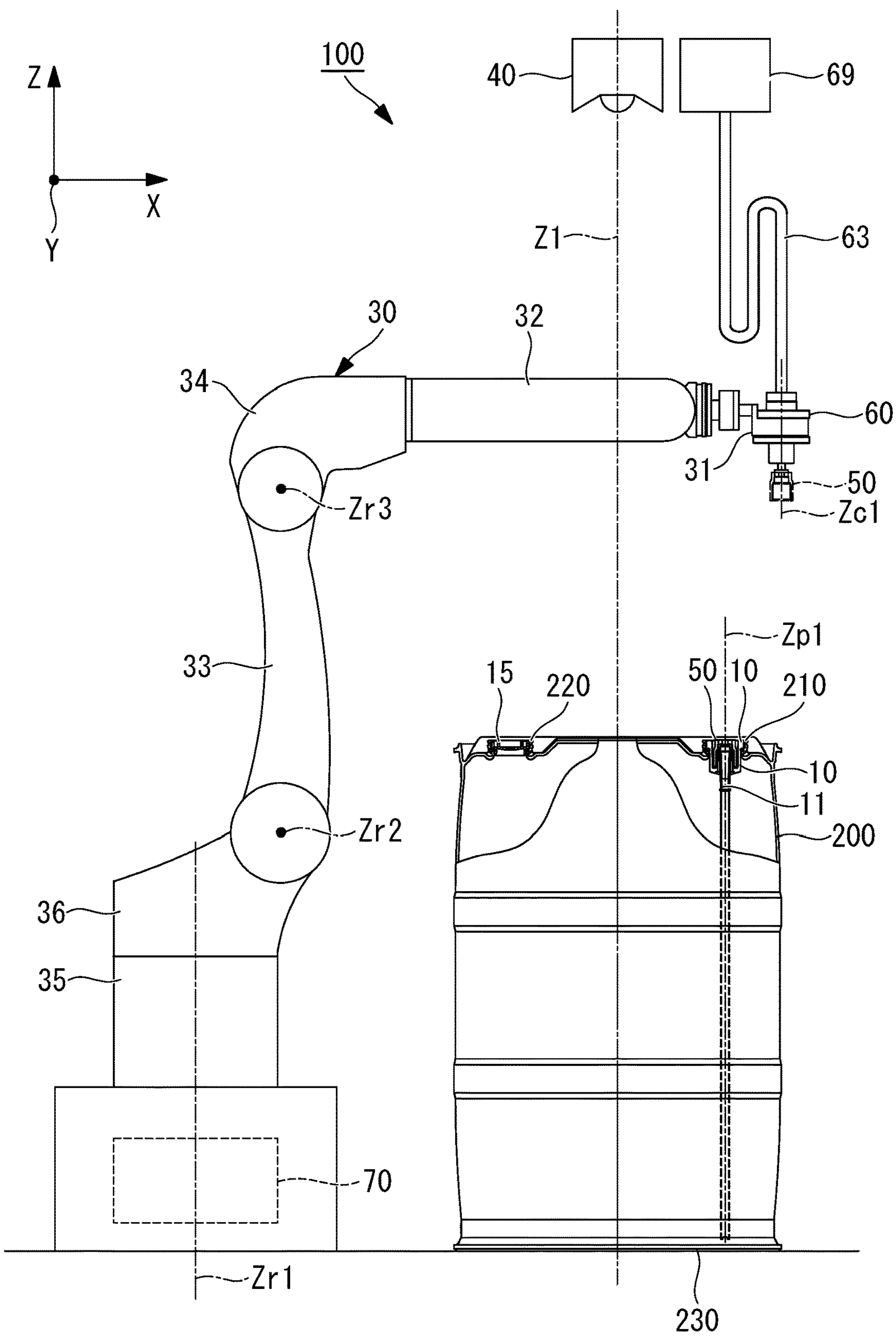
FIG. 1 is a side view illustrating a liquid supply device of one embodiment of the present invention and illustrates a state where a robot grips and transports a cap tool.
Figure 2:
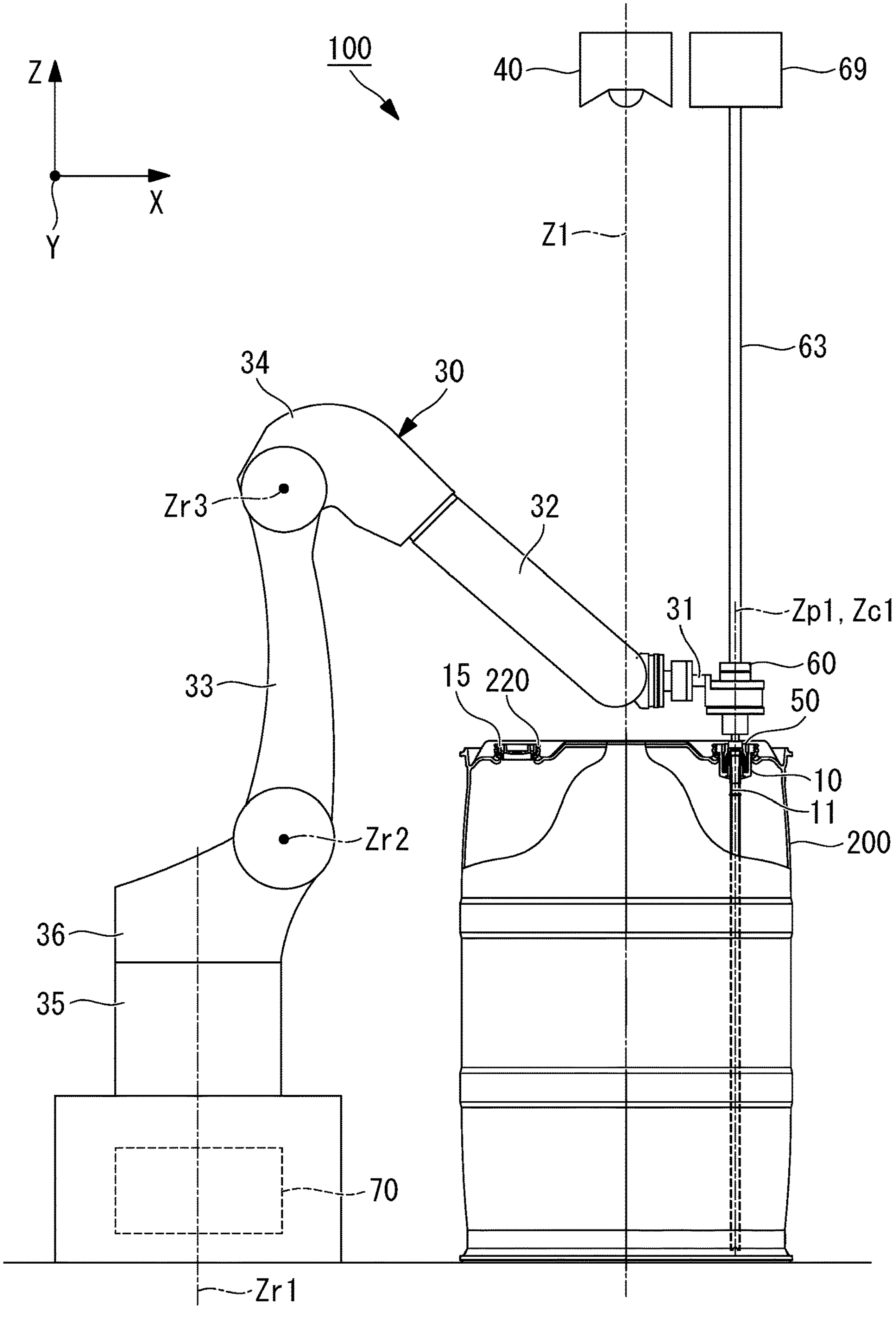
FIG. 2 is a side view illustrating the liquid supply device of one embodiment of the present invention and illustrates a state where the robot has arranged the cap tool near a plug.
Figure 3:
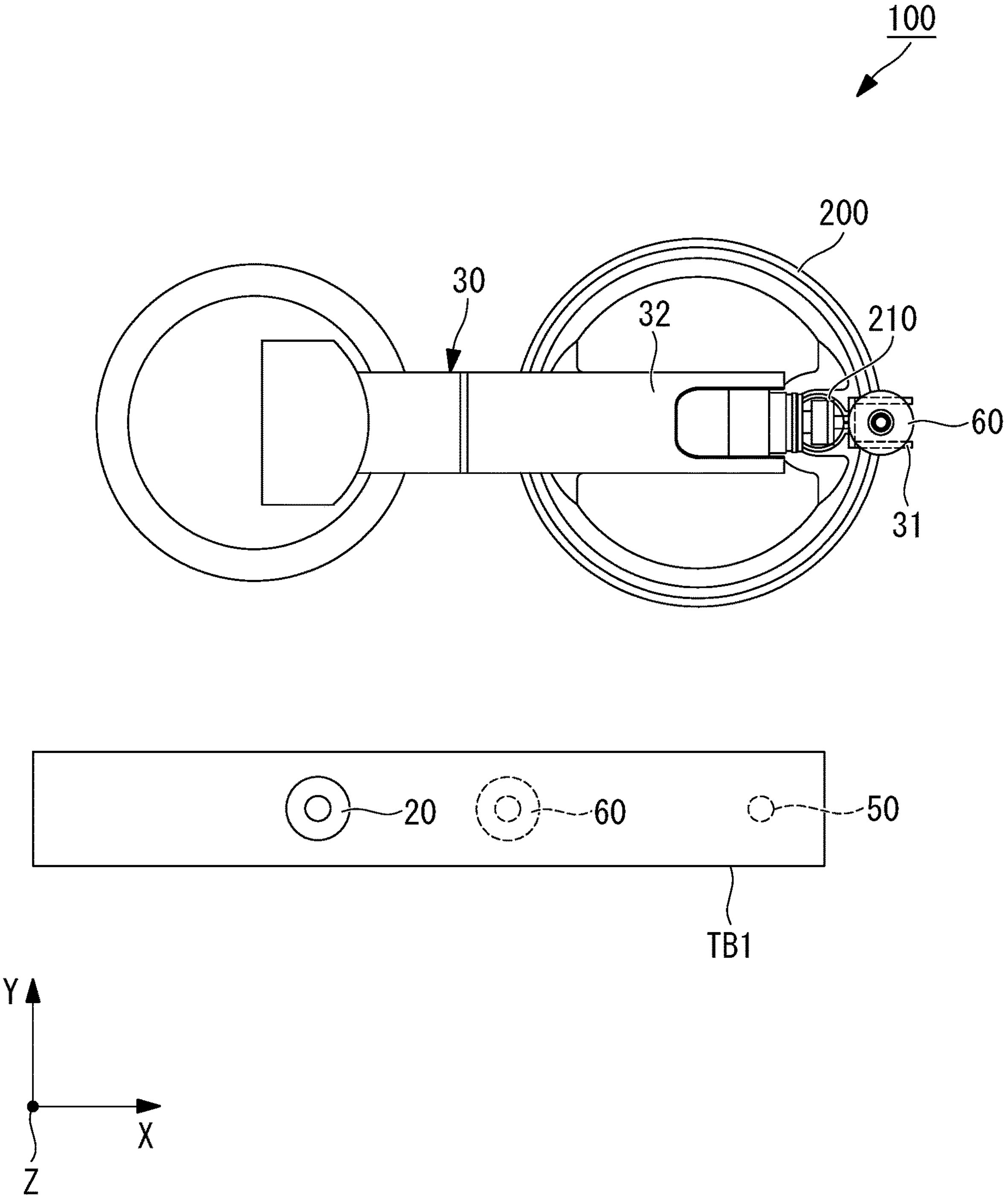
FIG. 3 is a plan view of the liquid supply device illustrated in FIG. 1 when viewed from above and illustrates a state where the robot grips and transports the cap tool.

A liquid supply device (cap detachment device) 100 of one embodiment of the present invention will be described below with reference to the drawings. FIG. 1 and FIG. 2 are side views illustrating the liquid supply device 100 of the present embodiment. FIG. 1 illustrates a state where a robot 30 grips and transports a cap tool 60. FIG. 2 illustrates a state where the robot 30 has arranged the cap tool 60 near the plug 10. FIG. 3 is a plan view of the liquid supply device 100 illustrated in FIG. 1 when viewed from above and illustrates a state where the robot 30 grips and transports the cap tool 60.

The liquid supply device 100 of the present embodiment illustrated in FIG. 1 is a device that supplies a liquid contained in a liquid storage container 200 to a plurality of supply target devices (not illustrated). Herein, the liquid in the present embodiment refers to pure water or various chemical solutions used in a semiconductor manufacturing process performed by a semiconductor manufacturing apparatus, for example.

As illustrated in FIG. 1 to FIG. 3, the liquid supply device 100 has the plug 10, a sealing stopper 15, the socket 20, the robot (gripping mechanism) 30, an image capturing unit (recognition unit) 40, a cap part 50, a cap tool (detachment mechanism) 60, and a control unit 70.

As illustrated in FIG. 1, the liquid storage container 200 is a container formed in a cylindrical shape about an axis Z1 extending in the perpendicular direction and is provided with the first opening 210 and a second opening 220 in the top face (top plate). An internal thread is formed in each inner circumferential surface of the first opening 210 and the second opening 220.

The plug 10 is fixed to the first opening 210 and has a plug side liquid channel 11 extending along a plug axis (first plug axis) Zp1. The plug side liquid channel 11 extends to a part near the bottom 230 of the liquid storage container 200. An external thread is formed in the outer circumferential surface at the upper end of the plug 10. The external thread of the plug 10 is engaged with the internal thread of the first opening 210, and thereby the plug 10 is fixed to the first opening 210.

Figure 4:
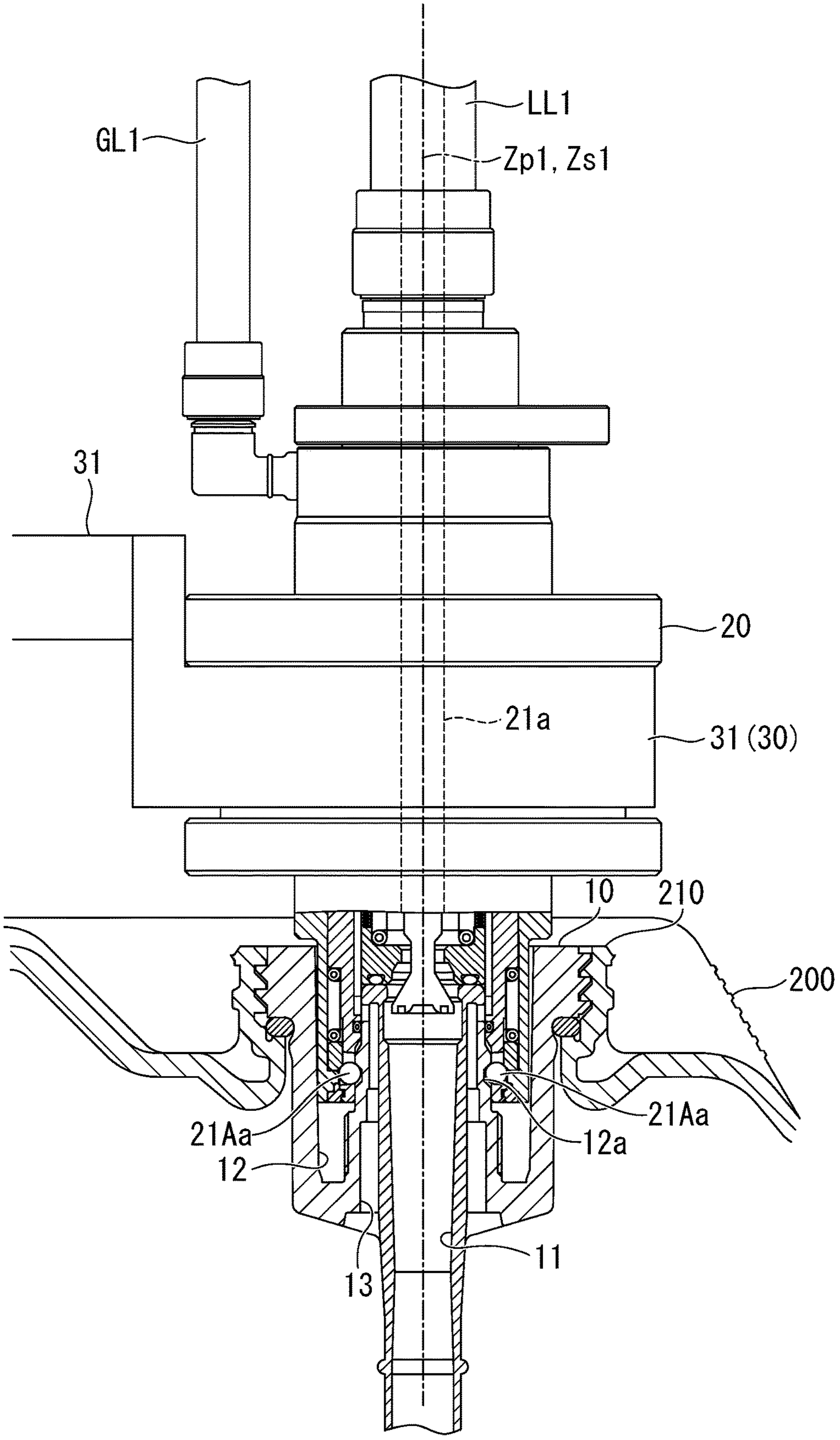
FIG. 4 is a partial sectional view illustrating a state where a socket is fixed to the plug.
Figure 7:
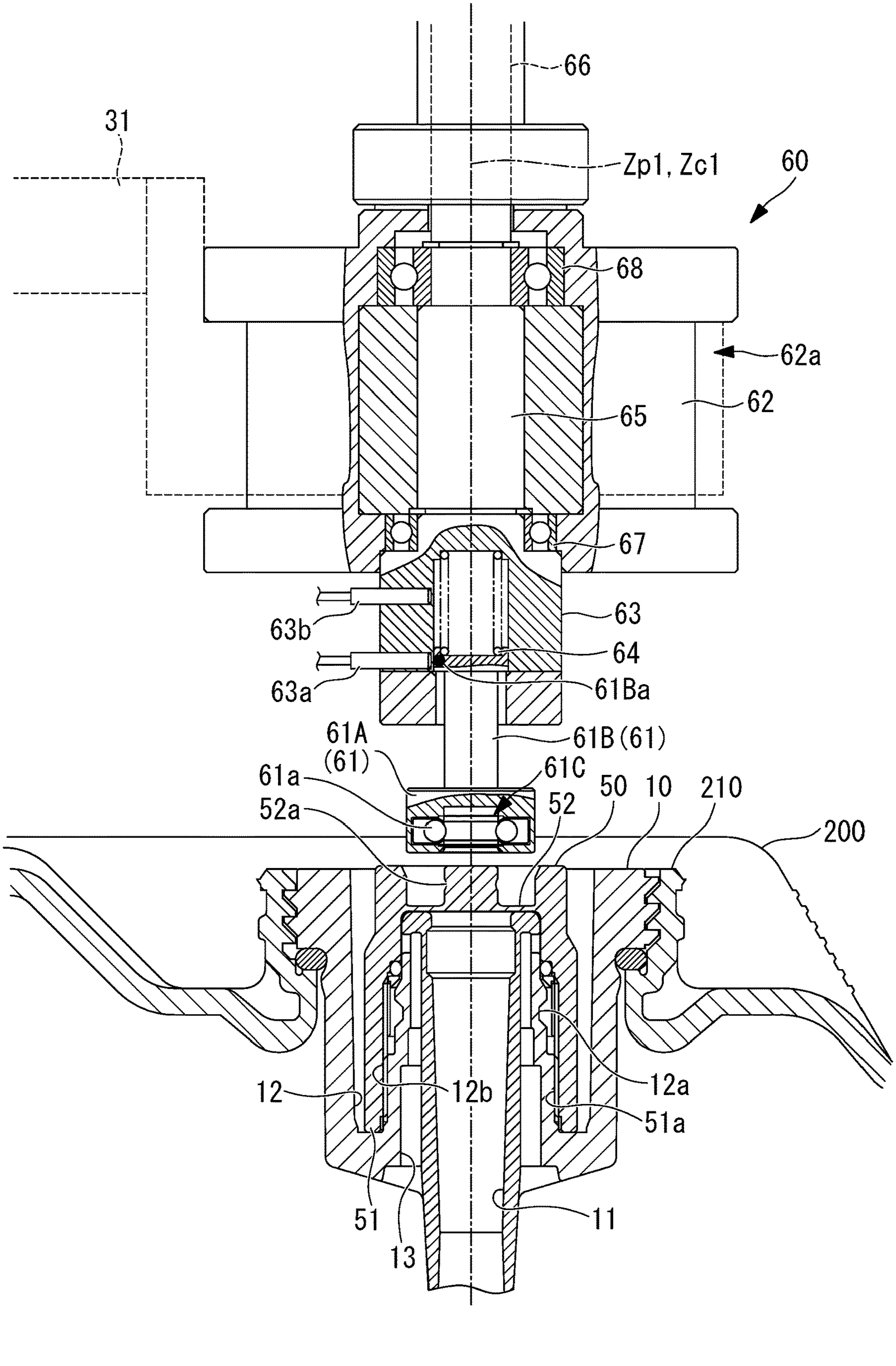
FIG. 7 is a partial sectional view illustrating a state where the cap tool has been moved close to the plug.
Figure 10:
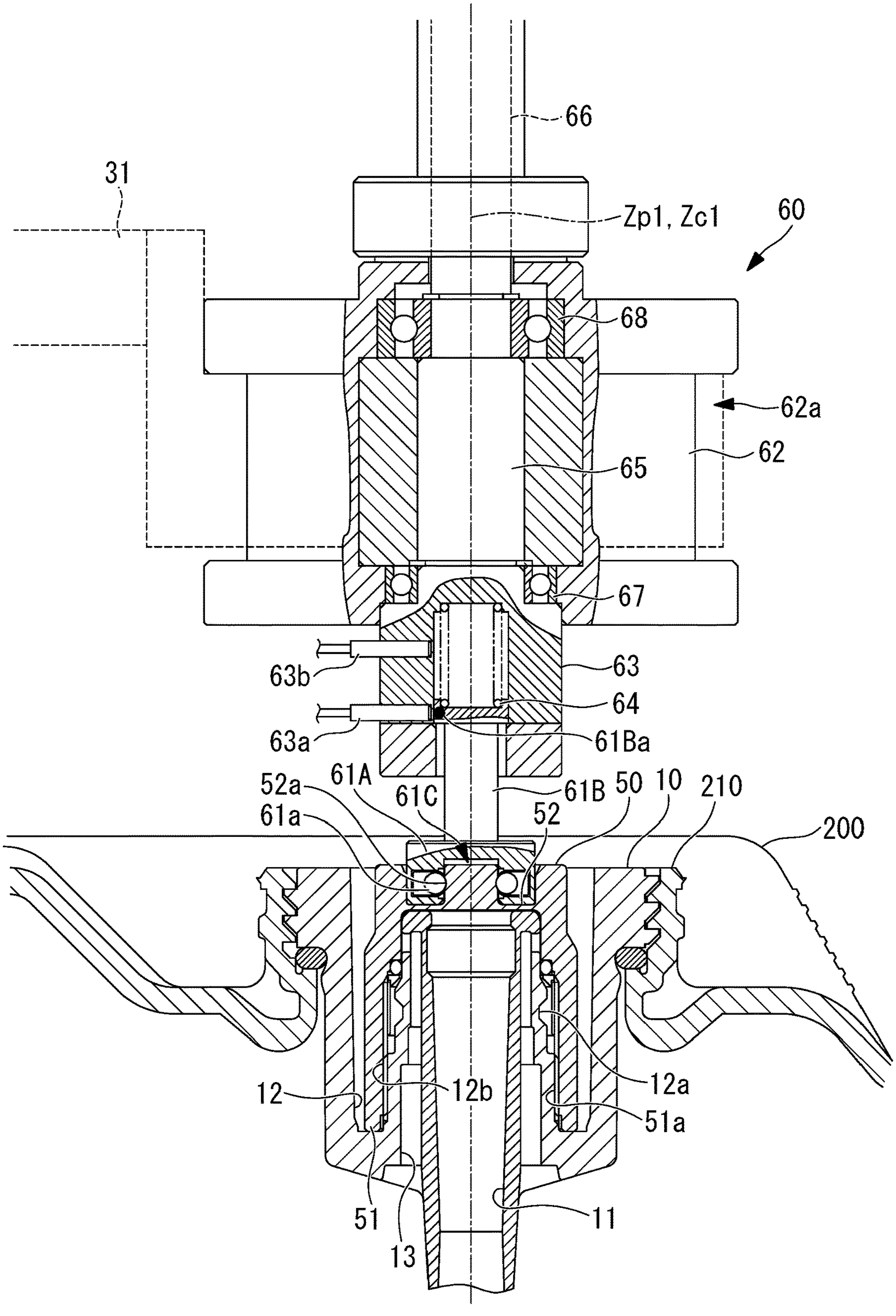
FIG. 10 is a partial sectional view illustrating a state where the cap is held by the cap tool.

FIG. 4 is a partial sectional view illustrating a state where the socket 20 has been fixed to the plug 10. As illustrated in FIG. 4, a groove (first groove) 12 extending in an annular shape about the plug axis Zp1 is formed in the tip (upper end) of the plug 10. A groove 12 has a fixing groove (plug side fixing part) 12*a* used for fixing lock balls 21A of the socket 20. A fixing groove 12*a* is formed annularly about the plug axis Zp1. As illustrated in FIGS. 7 and 10, an external thread (second thread part) 12*b* configured to engage with the internal thread (first thread part) 51*a* of the cap part 50 is formed in the groove 12 of the plug 10.

As illustrated in FIG. 1, the sealing stopper 15 is a member fixed to the second opening 220 and configured to seal the second opening 220. An external thread is formed in the outer circumferential surface of the sealing stopper 15. The external thread of the sealing stopper 15 has been engaged with the internal thread of the second opening 220, and thereby the sealing stopper 15 is fixed to the second opening 220.

The socket 20 is a device attached to the plug 10 by the robot 30 in a state where the cap part 50 has been detached from the plug 10 by the cap tool 60. The socket 20 is a device for supplying a liquid stored in the liquid storage container 200 to a supply target device via the plug side liquid channel 11 of the plug 10.

As illustrated in FIG. 4, the socket 20 has a socket side liquid channel 21*a* detachably attached to the plug 10 and extending along a socket axis (first socket axis) Zs1. The socket 20 is connected to a liquid pipe LL1 used for supplying a liquid to a supply target device and a gas pipe GL1 used for supplying a gas to the liquid storage container 200. The gas supplied from the gas pipe GL1 is supplied to a space above the liquid storage container via a plug side gas channel 13 of the plug 10. The socket 20 is gripped by a hand 31 of the robot 30.

As illustrated in FIG. 4, the tip (lower end) of the socket 20 has a plurality of lock balls 21Aa secured in the fixing groove 12*a* of the plug 10 extending annularly about the socket axis Zs1. The lock balls 21Aa are arranged at multiple positions spaced apart from each other about the socket axis Zs1.

The socket 20 adjusts the position on the tip side where the lock balls 21Aa are arranged and has an adjustment part (not illustrated) inserted in the groove 12 of the plug 10. When the position on the tip side is adjusted by the adjustment part, the socket 20 is switched between a connected state where the lock balls 21Aa are secured in the fixing groove 12*a* of the plug 10 and a released state where the lock balls 21Aa are not secured in the fixing groove 12*a* of the plug 10.

As illustrated in FIGS. 1 to 3, the robot 30 is a mechanism that grips the socket 20 and the cap tool 60 and arranges the socket 20 and the cap tool 60 in a predetermined attitude at a three-dimensional position defined by an axis X, an axis Y, and an axis Z within a motion range. The robot 30 is a six-axis articulated robot, for example. The robot 30 has the hand 31, a wrist 32, a first arm 33, a second arm 34, a base part 35, and a turning body 36.

The turning body 36 is rotatably supported about an axis Zr1 perpendicular to the base part 35. The first arm 33 is rotatably supported with respect to the turning body 36 about a horizontal axis Zr2. The second arm 34 is rotatably supported with respect to the first arm 33 about a horizontal axis Zr3. The wrist 32 is attached to the second arm 34 at one end and attached to the hand 31 at the other end.

It is possible to arrange the wrist 32 at any three-dimensional position within the motion range of the wrist 32 by combining the rotational operation of the turning body 36 with respect to the base part 35, the rotational operation of the first arm 33 with respect to the turning body 36, and the rotational operation of the second arm 34 with respect to the first arm 33. Further, the wrist 32 is rotatable about three axes and can take any attitude by displacing the hand 31 about the three axes.

The image capturing unit 40 is a device that captures an image of the top face of the plug 10 and recognizes the position in the three-dimensional space of the plug 10 and the orientation of the plug axis Zp1 of the plug 10. The image capturing unit 40 transfers a recognition result of the position in the three-dimensional space of the plug 10 and the orientation of the plug axis Zp1 of the plug 10 to the control unit 70.

As illustrated in FIG. 7, the cap part 50, formed of a resin material, is a member that seals the plug side liquid channel 11. The cap part 50 has an insertion part 51 to be inserted in the groove 12 of the plug 10. The insertion part 51 is formed so as to extend cylindrically about a cap axis Zc1. An internal thread (first thread part) 51*a* is formed in the inner circumferential surface of the insertion part 51.

Figure 8:
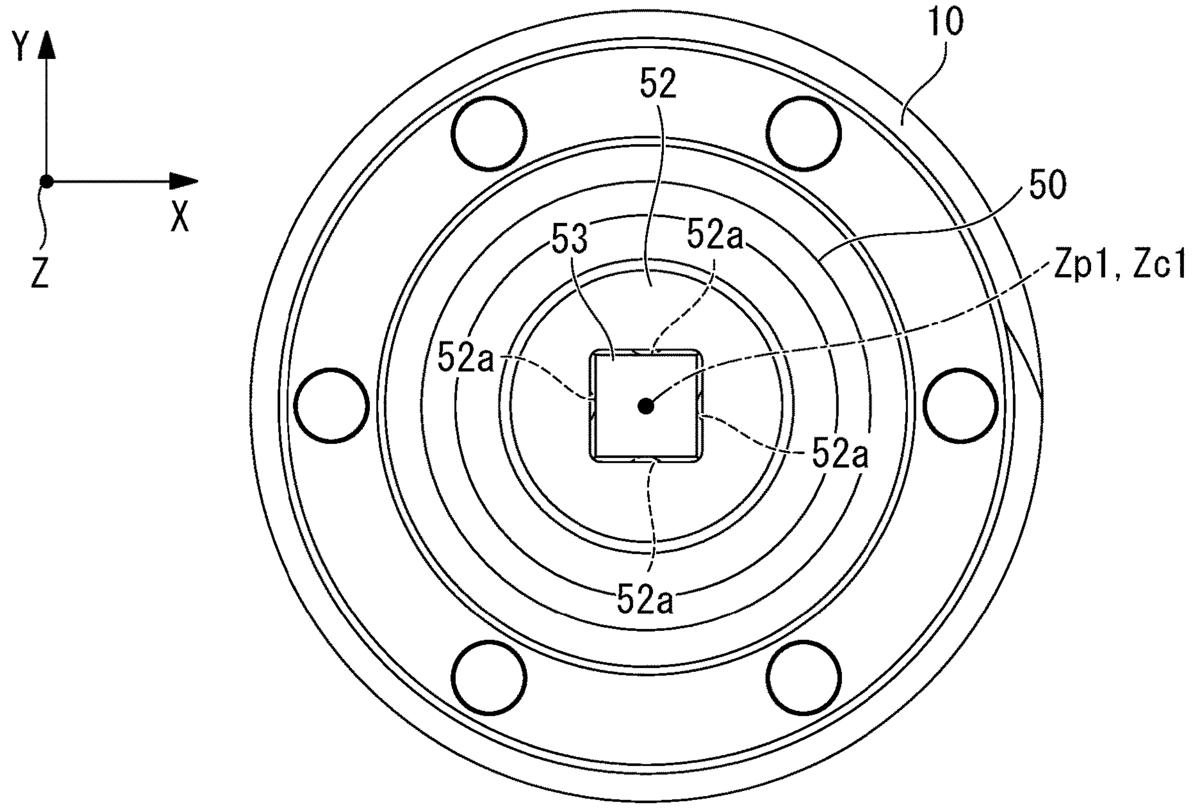
FIG. 8 is a plan view of the plug and the cap part when viewed from above.

FIG. 8 is a plan view of the plug 10 and the cap part 50 when viewed from above. As illustrated in FIG. 8, a housing groove 52 formed annularly about the plug axis Zp1 and capable of housing the holding part 61 is formed in the top face of the cap part 50. As illustrated in FIG. 7 and FIG. 8, a plurality of fixing groove 52*a* in which a plurality of lock balls 61*a* are secured are formed in the housing groove 52. A convex center part 53 arranged on the inner circumferential side of the housing groove 52 and configured to be held by the holding part 61 is formed to the top face of the cap part 50.

As illustrated in FIG. 7, the cap tool 60 is a mechanism that rotates the cap part 50 about the cap axis (second axis) Zc1 and detaches the cap part 50 from the plug 10. The cap tool 60 has the holding part 61, a grip part 62, a support part 63, a spring (pushing part) 64, a rotary shaft (rotary part) 65, a flexible shaft (transmission part) 66, a bearing 67, and a bearing 68.

The holding part 61 is a member that detachably holds the cap part 50 and is provided with lock balls (lock mechanism) 61*a* that generates pushing force toward the cap axis Zc1.

The holding part 61 is housed in the housing groove 52, engages the plurality of lock balls 61*a* into the plurality of fixing grooves 52*a*, pushes the lock balls 61*a* to the inner circumferential side toward the fixing grooves 52*a*, and thereby holds the cap part 50.

Figure 9:
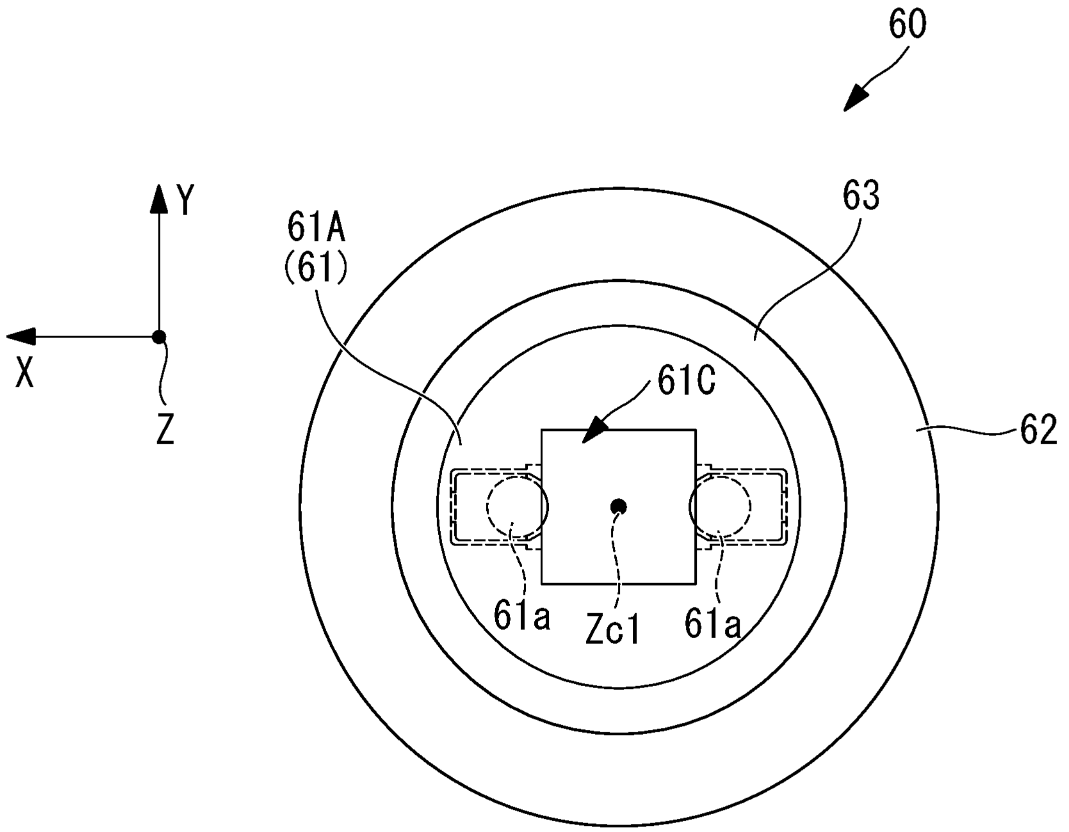
FIG. 9 is a plan view of the cap tool when viewed from below.

The holding part 61 has a body 61A, which houses the lock balls 61*a*, and a shaft part 61B fixed to the body 61A and extending along the cap axis Zc1. As illustrated in FIG. 7 and FIG. 9, a recess 61C in which the lock balls 61*a* that hold the center part 53 of the cap part 50 by elastic force are arranged is formed in the bottom face of the body 61A. The upper end of the shaft part 61B is housed in the support part 63 in a manner movable along the cap axis Zc1. Pushing force in a direction in which the shaft part 61B comes close to the plug 10 is applied to the upper end of the shaft part 61B by the spring 64.

As illustrated in FIG. 8, the center part 53 of the cap part 50 has substantially a square shape when viewed along the plug axis Zp1. The recess 61C of the holding part 61 has substantially a square shape when viewed along the cap axis Zc1 so as to house the center part 53.

Therefore, the center part 53 of the cap part 50 is not rotated about the cap axis Zc1 against the holding part 61 when housed in the recess 61C of the holding part 61. As discussed above, the holding part 61 holds the center part 53 of the cap part 50 housed in the recess 61C by the lock balls 61*a* so that the center part 53 is not rotated about the cap axis Zc1.

As illustrated in FIG. 7, the grip part 62 is formed substantially cylindrically along the cap axis Zc1 and gripped by the hand 31 of the robot 30 that holds the cap tool 60. A recess 62*a* formed annularly about the cap axis Zc1 is formed on the outer circumferential side of the grip part 62. The recess 62*a* is a part gripped by the hand 31.

The support part 63 is a member that is attached to the grip part 62 and supports the holding part 61 movably along the cap axis Zc1. The support part 63 is connected to the rotary shaft 65 and attached to the grip part 62 rotatably about the cap axis Zc1 via the bearing 67. The support part 63 is rotated about the cap axis Zc1 together with the rotary shaft 65 in response to rotation of the rotary shaft 65.

The spring 64 is a member that is formed of an elastic member (a metal material, a resin material, or the like) that expands and contracts along the cap axis Zc1 and applies, to the holding part 61, pushing force in a direction coming close to the plug 10 along the cap axis Zc1.

The rotary shaft 65 is a member that rotates the holding part 61 about the cap axis Zc1. The rotary shaft 65 is attached to the grip part 62 rotatably about the cap axis Zc1 via the bearing 68. The rotary shaft 65 transmits, to the support part 63, the rotary motive power about the cap axis Zc1 transmitted from a flexible shaft 66.

The support part 63 supports the shaft part 61B of the holding part 61 so that the shaft part 61B is not rotated relatively about the cap axis Zc1. Thus, in response to rotation of the support part 63 about the cap axis Zc1, the holding part 61 is rotated about the cap axis Zc1 in synchronization with the support part 63. The rotary shaft 65 rotates the holding part 61 in the anticlockwise direction (predetermined direction) about the cap axis Zc1 via the support part 63, and thereby the cap part 50 is detached from the plug 10.

As illustrated FIG. 7, the support part 63 is provided with a magnetic proximity sensor (first detection unit) 63*a* and a magnetic proximity sensor (second detection unit) 63*b*. The magnetic proximity sensor 63*a* and the magnetic proximity sensor 63*b* each are a sensor that transitions to an on-state when a magnet 61Ba embedded in the upper end of the shaft part 61B of the holding part 61 is arranged at a position close thereto. The detection states (on-state or off-state) of the magnetic proximity sensor 63*a* and the magnetic proximity sensor 63*b* are output to the control unit 70.

The magnetic proximity sensor 63*a* is arranged at a position to which the magnet 61Ba comes close in an expanded state where the spring 64 is expanded. Thus, the magnetic proximity sensor 63*a* can detect the expanded state where the spring 64 is expanded. The magnetic proximity sensor 63*b* is arranged at a position to which the magnet 61Ba comes close in a contracted state where the spring 64 is contracted. Thus, the magnetic proximity sensor 63*b* can detect the contracted state where the spring 64 is contracted.

The flexible shaft 66 is a device that transmits rotary motive power from rotation of the rotary shaft 65 about the cap axis Zc1 to the holding part 61 via the rotary shaft 65. The flexible shaft 66 is formed of an elastically deformable material in a long shape and connected to a motor (motive power mechanism) 69. The rotational rate and the rotating direction of the motor 69 are controlled by a control signal transmitted from the control unit 70.

The control unit 70 controls the robot 30 so that the socket 20 gripped by the hand 31 or the cap tool 60 is arranged in a desired attitude at a desired position based on a recognition result of the position in the three-dimensional space of the plug 10 and the orientation of the plug axis Zp1 of the plug 10 transmitted from the image capturing unit 40.

Figure 5:
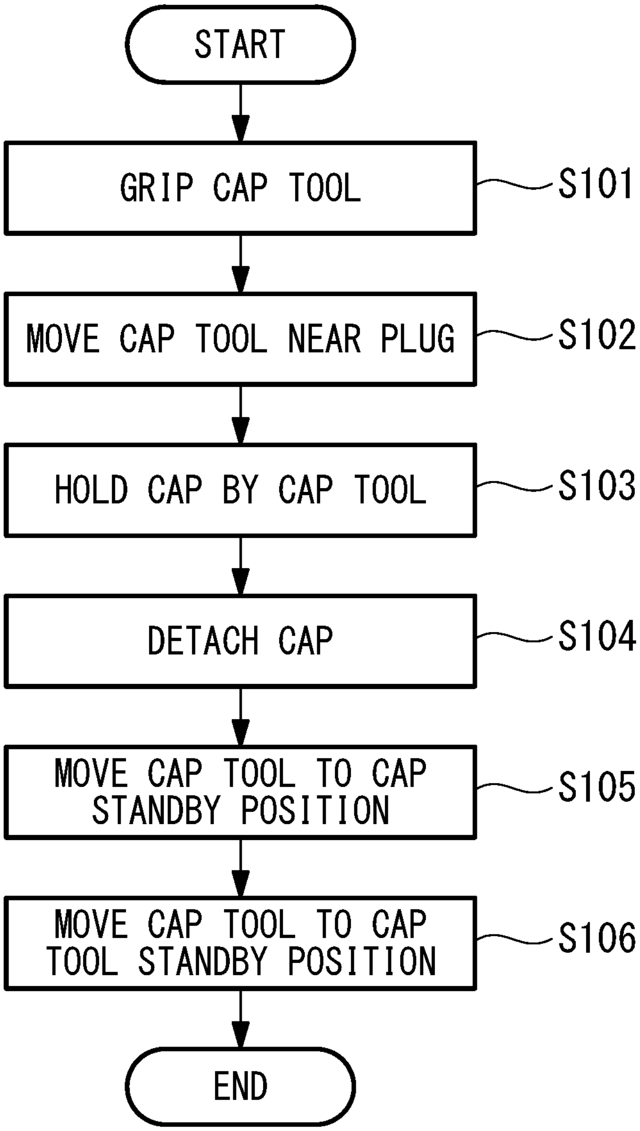
FIG. 5 is a flowchart illustrating a control method for the liquid supply device of the present embodiment and illustrates a process of detaching a cap part from the plug.

Next, a control method for the liquid supply device 100 of the present embodiment will be described with reference to FIG. 5. FIG. 5 is a flowchart illustrating the control method for the liquid supply device 100 of the present embodiment and illustrates a process of detaching the cap part 50 from the plug 10. Each process illustrated in FIG. 5 is performed when the control unit 70 executes the control program.

In step S101, the control unit 70 controls the robot 30 to grip the cap tool 60 installed on an installation table TB1. The control unit 70 stores in advance the position of the cap tool 60 installed on the installation table TB1 and moves the hand 31 to a position near the cap tool 60 to grip the cap tool 60.

In step S102, the control unit 70 controls the robot 30 so that the cap tool 60 moves close to the plug 10 with the hand 31 gripping the cap tool 60. The control unit 70 controls the robot 30 so that the tip of the holding part 61 is arranged at a position distant by a certain distance along the plug axis Zp1 from the three-dimensional position of the plug 10 recognized by the image capturing unit 40. The robot 30 grips the cap tool 60 so that the cap part 50 and the plug 10 are in an attitude where the orientation of the cap axis Zc1 matches the orientation of the plug axis Zp1 recognized by the image capturing unit 40 when arranging the cap tool 60 near the plug 10.

Figure 6:
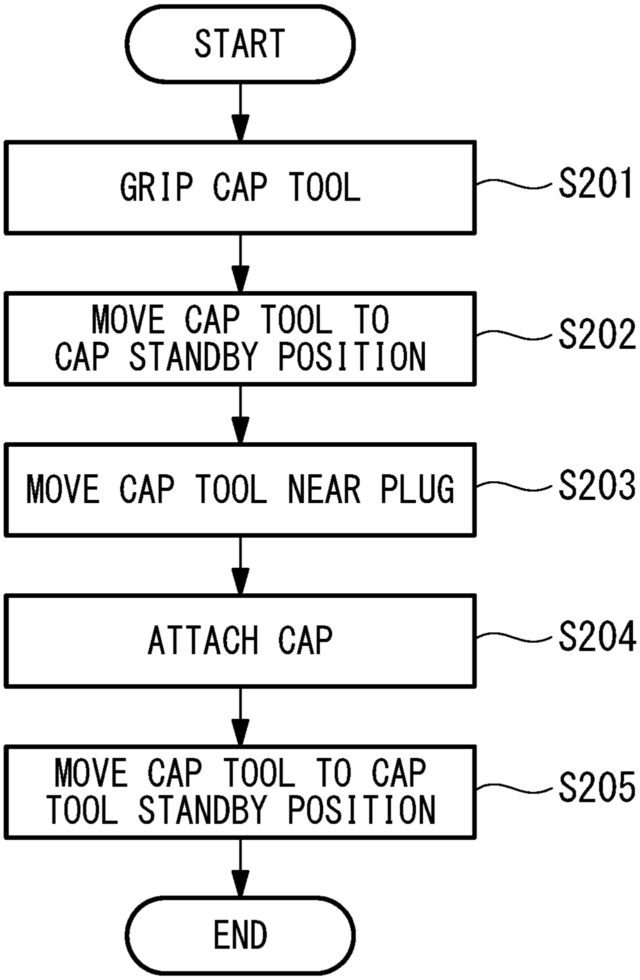
FIG. 6 is a flowchart illustrating a control method for the liquid supply device of the present embodiment and illustrates a process of attaching the cap part to the plug.

In step S103, the control unit 70 controls the robot 30 gripping the cap tool 60 to hold the cap part 50 by the cap tool 60. The robot 30 moves the cap tool 60 to the cap part 50 along the plug axis Zp1. As illustrated in FIG. 6, the cap tool 60 has the holding part configured to hold the cap part 50. The cap tool 60 moves toward the cap part 50 so that the holding part 61 is housed in the housing groove 52 and the lock balls 61*a* are fixed to the fixing grooves 52*a*.

When the cap tool 60 is further moved downward with the lock balls 61*a* being in contact with the center part 53 of the cap part 50, the spring 64 is contracted, and the pushing force of the spring 64 gradually increases. When the pushing force of the spring 64 increases and the lock balls 61*a* move in a direction away from the plug axis Zp1, the lock balls 61*a* move to the positions of the fixing grooves 52*a* and are fixed to the fixing grooves 52*a*. This results in a state where the cap part 50 is held by the holding part 61 of the cap tool 60.

The robot 30 then moves the cap tool 60 upward along the plug axis Zp1 so that the contracted spring 64 becomes the equilibrium length, and the state illustrated in FIG. 10 is thus obtained. The holding part 61 houses the center part 53 in the recess and thereby holds the cap part 50 so that the center part 53 is not rotated about the cap axis Zc1 relative to the holding part 61.

In step S104, the control unit 70 rotates the holding part 61 in the anticlockwise direction with the cap part 50 being held by the holding part 61 and thereby detaches the cap part 50 from the plug 10. When the cap part 50 is rotated anticlockwise, the external thread 12*b* of the plug 10 and the internal thread 51*a* of the cap part 50 are disengaged from each other into the state illustrated in FIG. 11, and the cap part 50 is detached from the plug 10. In step S104, the control unit 70 performs control such that the position where the hand 31 of the robot 30 grips the grip part 62 does not change.

Figure 11:
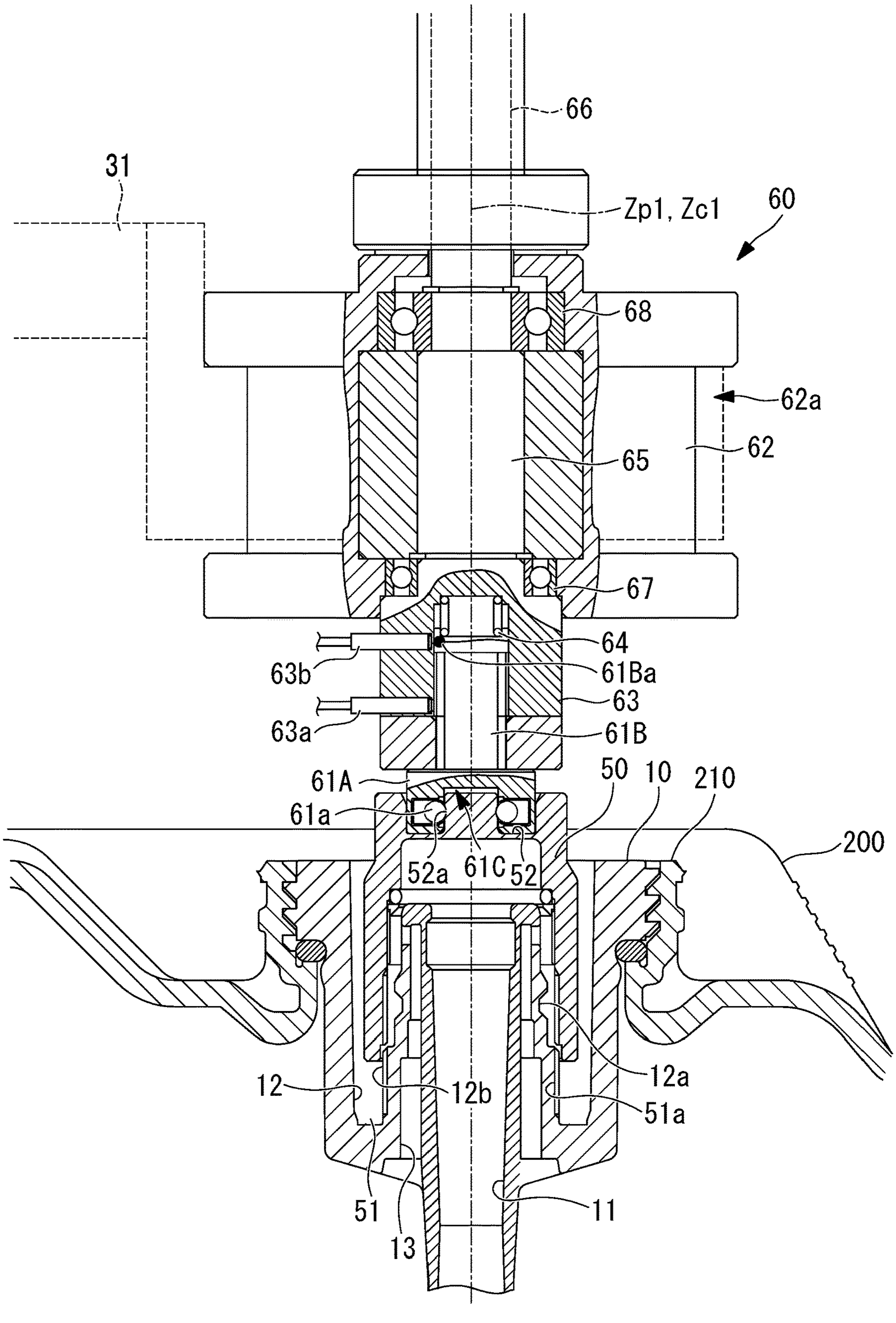
FIG. 11 is partial sectional view illustrating a state where the cap has been detached from the plug by the cap tool.

As illustrated in FIG. 11, when the external thread 12*b* of the plug 10 and the internal thread 51*a* of the cap part 50 are disengaged from each other, the holding part 61 comes close to the grip part 62 of the cap tool 60, the spring 64 is contracted, and the shaft part 61B is housed inside the support part 63. In such a way, the support part 63 supports the holding part 61 to be movable along the cap axis Zc1 and houses the shaft part 61B therein. Since the position on the cap axis Zc1 of the holding part 61 is changed with respect to the support part 63 with the position of the support part 63 left fixed, the position of the hand 31 of the robot 30 gripping the grip part 62 is not required to be moved in accordance with the motion of the cap part 50.

In step S104, the control unit 70 performs control to start transmission of rotary motive power from the motor 69 to the flexible shaft 66 when the magnetic proximity sensor 63*a* detects that the expanded state where the spring 64 is expanded (the state illustrated in FIG. 10) takes place. Further, the control unit 70 performs control to stop the transmission of rotary motive power from the motor 69 to the flexible shaft 66 when the magnetic proximity sensor 63*b* detects that the contracted state where the spring 64 is contracted (the state illustrated in FIG. 11) takes place.

In step S105, the control unit 70 controls the robot 30 to move the cap tool 60 to a cap standby position (the position of reference 50 in FIG. 3) with the cap part 50 being held by the holding part 61. A fixing part (not illustrated) having an external thread that engages with the internal thread 51*a* of the cap part 50 is installed at the cap standby position. The control unit 70 causes the motor 69 to rotate in the clockwise direction with the internal thread 51*a* of the cap part 50 and the external thread of the fixing part being engaged with each other to further engage the internal thread of the cap part 50 with the external thread of the fixing part.

In step S106, the control unit 70 controls the robot 30 to move the cap tool 60 not holding the cap part 50 to a cap tool standby position (the position of reference 60 in FIG. 3). In accordance with step S101 to step S106 described above, the cap part 50 is detached from the plug 10.

After the cap part 50 is detached from the plug 10, the control unit 70 controls the robot 30 to attach the socket 20 to the plug 10. When the socket 20 has been attached to the plug 10, the liquid stored in the liquid storage container 200 is supplied to a supply target device via the socket 20.

While the supply of the liquid to the supply target device by the liquid supply device 100 is continued as long as the liquid in the liquid storage container 200 remains, the liquid storage container 200 is required to be replaced with a new liquid storage container when the liquid in the liquid storage container 200 is depleted or reduced below a predetermined amount. In such a case, after the socket 20 is detached from the plug 10, the cap part 50 is re-attached to the plug 10.

Next, a control method for the liquid supply device 100 of the present embodiment will be described with reference to FIG. 6. FIG. 6 is a flowchart illustrating the control method for the liquid supply device 100 of the present embodiment and illustrates a process of attaching the cap part 50 to the plug 10. Each process illustrated in FIG. 6 is performed when the control unit 70 executes the control program.

In step S201, the control unit 70 controls the robot 30 to grip the cap tool 60 installed on an installation table TB1. The control unit 70 stores in advance the cap tool standby position (the position of reference 60 in FIG. 3) of the cap tool 60 installed on the installation table TB1 and controls the robot 30 to move the hand 31 to the cap tool standby position and grip the cap tool 60.

In step S202, the control unit 70 controls the robot 30 to move the cap tool 60 to the cap standby position (the position of reference 50 in FIG. 3) and hold the cap part 50 in the holding part 61. The control unit 70 causes the motor 69 to rotate in the anticlockwise direction with the internal thread 51*a* of the cap part 50 and the external thread of the fixing part being engaged with each other and disengages the internal thread of the cap part 50 and the external thread of the fixing part from each other.

Figure 12:
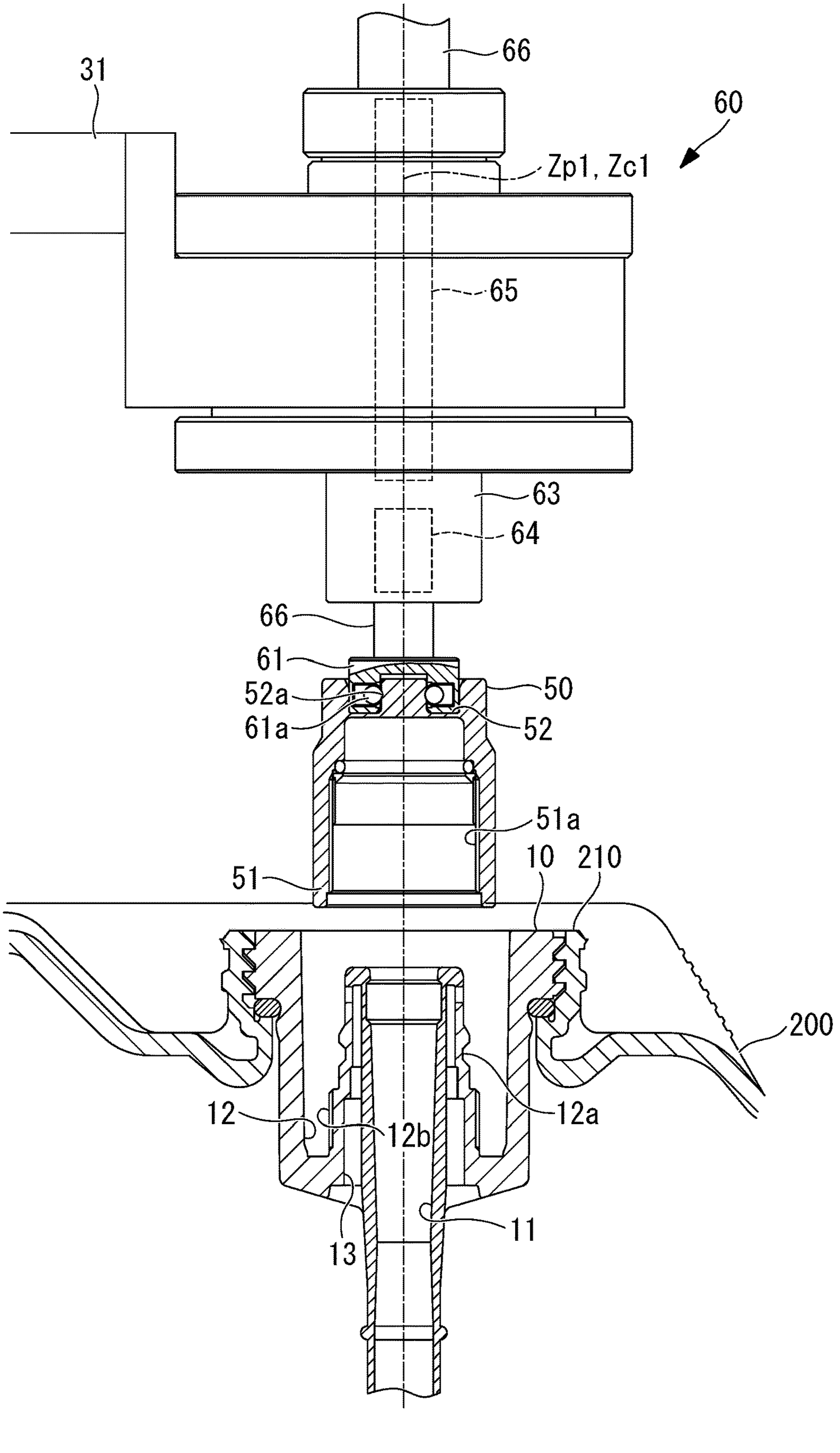
FIG. 12 is a partial sectional view illustrating a state where the cap tool has been moved to above the plug.

In step S203, the control unit 70 controls the robot 30 to move the cap tool 60 near the plug 10 with the hand 31 gripping the cap tool 60. The control unit 70 controls the robot 30 so that the holding part 61 is arranged at a position distant by a certain distance along the plug axis Zp1 with respect to the coordinates P of the plug 10 recognized by the image capturing unit 40, and the state illustrated in FIG. 12 is obtained. FIG. 12 is a partial sectional view illustrating a state where the cap tool is moved to above the plug.

In step S204, the control unit 70 controls the robot 30 gripping the cap tool 60 to attach the cap part 50 to the plug 10. The robot 30 moves the cap tool 60 toward the plug 10 along the plug axis Zp1, and the state illustrated in FIG. 11 is obtained. The control unit 70 rotates the holding part 61 by the rotary shaft 65 in the clockwise direction (the direction opposite to the predetermined direction) with the cap part 50 being held by the holding part 61. Accordingly, the external thread 12*b* of the plug 10 and the internal thread 51*a* of the cap part 50 are engaged with each other, and the cap part 50 is attached to the plug 10.

The cap tool 60 transmits the rotary motive power applied in the clockwise direction transmitted from the flexible shaft 66 to the holding part 61 via the rotary shaft 65 and the support part 63 and thereby rotates the cap part 50 clockwise. When the cap part 50 is rotated clockwise, the external thread 12*b* of the plug 10 and the internal thread 51*a* of the cap part 50 are engaged with each other, the state illustrated in FIG. 10 is thus obtained, and the cap part 50 is attached to the plug 10.

In step S205, the control unit 70 controls the cap tool 60 so that the holding part 61 moves upward along the cap axis Zc1, and the state illustrated in FIG. 7 where the cap part 50 has been detached from the holding part 61 is obtained. The control unit 70 then controls the robot 30 to move the cap tool 60 to the cap tool standby position with the hand 31 gripping the cap tool 60.

The effects and advantages achieved by the liquid supply device 100 of the present embodiment described above will be described.

According to the liquid supply device 100 of the present embodiment, the cap tool 60 having the grip part 62 gripped by the robot 30 uses the holding part 61 to hold the cap part 50 attached to the plug 10. The rotary shaft 65 of the cap tool 60 rotates the holding part 61 in the anticlockwise direction about the cap axis Zc1 and thereby detaches the cap part 50 from the plug 10. When the cap part 50 is detached from the plug 10, the internal thread 51*a* of the cap part 50 and the external thread 12*b* of the plug 10 are gradually disengaged, and the cap part 50 is moved in a direction away from the plug 10.

The holding part 61 holding the cap part 50 is supported movably along the cap axis Zc1 by the support part 63, and pushing force is applied by the spring 64 to the holding part 61 in the direction coming close to the plug 10 along the cap axis Zc1. Thus, in detachment of the cap part 50 from the plug 10, when the cap part 50 is moved in the direction away from the plug 10, the spring 64 is contracted with the position of the support part 63 being fixed, and the holding part 61 is moved in the direction away from the plug 10 along the cap axis Zc1.

Since the position on the cap axis Zc1 of the holding part 61 is changed with respect to the support part 63 with the position of the support part 63 left fixed, the position of the hand 31 of the robot 30 gripping the grip part 62 is not required to be moved in accordance with the motion of the cap part 50. It is therefore possible to automate the operation to suitably move the holding part 61 holding the cap part 50 in accordance with an amount of motion of the cap part 50 and thereby detach the cap part 50 from the plug 10.

According to the liquid supply device 100 of the present embodiment, since the flexible shaft 66 is elastically deformable, even when the cap tool 60 is arranged at any position on the three-dimensional space by the hand 31 of the robot 30, the rotary motive power generated by the motor 69 can be reliably transmitted to the rotary shaft 65. Further, since no motive power mechanism that generates rotary motive power is required to be provided to the cap tool 60, this can reduce the size of the cap tool that is gripped by the hand 31.

According to the liquid supply device 100 of the present embodiment, the control unit 70 controls the motor 69 to start transmission of rotary motive power to the flexible shaft 66 when the magnetic proximity sensor 63*a* detects the expanded state of the spring 64. It is thus possible to start the operation to detach the cap part 50 from the plug 10 while the cap part 50 is pushed by the spring 64 to a position close to the plug 10.

Further, the control unit 70 controls the motor 69 to stop the transmission of rotary motive power to the flexible shaft 66 when the magnetic proximity sensor 63*b* detects the contracted state of the spring 64. It is thus possible to stop the transmission of rotary motive power from the motor 69 to the rotary shaft 65 while the spring 64 is contracted and the cap part 50 has been detached from the plug 10.

According to the liquid supply device 100 of the present embodiment, the holding part 61 housed in the housing groove 52 formed in the top face of the cap part 50 holds the center part 53 of the cap part 50 by the lock balls 61*a* so that the center part 53 is not rotated about the cap axis Zc1. Thus, the rotary shaft 65 rotates the holding part 61 about the cap axis Zc1, and this enables rotation of the cap part 50 about the cap axis Zc1.

Further, since the center part 53 of the cap part 50 is housed in the recess 61C formed in the bottom face of the holding part 61 and fixed by the lock balls 61*a*, there is no likelihood of elastic deformation of the cap part 50 formed of a resin material and release of the state where the lock balls 61*a* fix the cap part 50. This is because the lock balls 61*a* apply force inwardly to fix the center part 53 toward the cap axis Zc1 and this causes almost no elastic deformation of the cap part 50.

According to the liquid supply device 100 of the present embodiment, it is possible to attach the cap part 50 to the plug 10 by rotating the holding part 61 in the anticlockwise direction by the rotary shaft 65 of the cap tool 60 used for detaching the cap part 50 from the plug 10.

What is claimed is:

1. A cap detachment device comprising:

a plug secured in an opening provided in a top face of a liquid storage container, the plug having a liquid channel extending in a first axis and a groove extending annularly about the first axis;

a cap part having an insertion part and configured to seal the liquid channel, the insertion part being inserted in the groove and extending cylindrically about the first axis; and a detachment mechanism configured to detach the cap part from the plug, wherein a first thread part is formed to the insertion part, wherein a second thread part configured to be engaged with the first thread part is formed in the groove, wherein the detachment mechanism has a holding part configured to hold the cap part, a grip part formed tubularly along a second axis and gripped by a gripping mechanism configured to grip the detachment mechanism, a support part attached to the grip part and configured to support the holding part movably along the second axis, a pushing part formed of an elastic member that expands and contracts along the second axis and applying, to the holding part, pushing force in a direction coming close to the plug along the second axis, and a rotary part configured to rotate the holding part about the second axis, and wherein the rotary part rotates the holding part holding the cap part in a predetermined direction about the second axis to detach the cap part from the plug.

2. The cap detachment device according to claim 1, wherein the cap part is formed of a resin material, wherein a housing groove, which is formed annularly about the first axis and configured to house the holding part, and a center part, which is arranged on an inner circumferential side of the housing groove and held by the holding part, are formed on a top face of the cap part, wherein a recess in which a lock mechanism configured to hold the center part by elastic force is arranged is formed in a bottom face of the holding part, and wherein the holding part holds the center part, which is housed in the recess, by the lock mechanism so that the center part is not rotated about the second axis.

3. The cap detachment device according to claim 1, wherein while holding the cap part, the rotary part rotates the holding part in a direction opposite to the predetermined direction to attach the cap part to the plug.

4. The cap detachment device according to claim 1 further comprising a transmission part formed of an elastically deformable material in a long shape, connected to a motive power mechanism, and configured to transmit rotary motive power generated by the motive power mechanism to the rotary part.

5. The cap detachment device according to claim 4 comprising:

a first detection unit configured to detect an expanded state where the elastic member is expanded;

a second detection unit configured to detect a contracted state where the elastic member is contracted; and a control unit configured to perform control to start transmission of the rotary motive power from the motive power mechanism to the transmission part when the first detection unit detects the expanded state and stop transmission of the rotary motive power from the motive power mechanism to the transmission part when the second detection unit detects the contracted state.

* * * * *